US006067895A

United States Patent [19]

Buist et al.

[11] Patent Number: 6,067,895

[45] Date of Patent: May 30, 2000

[54] BREWER APPARATUS HAVING A WATER FLOW CONTROL DEVICE

[76] Inventors: Ronald William Buist, 1284 Avon Crescent, Oakville, Ontario, Canada, L6J2T6; William A. Dahmen, 1313 Meadowridge Trail, Goshen, Ky. 40026

[21] Appl. No.: 09/368,196

[22] Filed: Aug. 4, 1999

Related U.S. Application Data

[60] Provisional application No. 60/116,393, Jan. 19, 1999.

[51] Int. Cl.[7] .................................................... A47J 31/00

[52] U.S. Cl. ................................ 99/305; 99/299; 99/283

[58] Field of Search ............................ 99/283, 299, 300, 99/305, 304; 251/309, 310; 222/129.2, 56, 66, 146.6

[56] References Cited

U.S. PATENT DOCUMENTS

| | | | |
|---|---|---|---|
| 5,000,352 | 3/1991 | Cleland | 222/129.2 |
| 5,251,541 | 10/1993 | Anson et al. | 99/280 |
| 5,350,082 | 9/1994 | Kiriakides, Jr. et al. | |
| 5,537,838 | 7/1996 | Mills et al. | 62/400 |
| 5,901,635 | 5/1999 | Lucas et al. | 99/285 |

*Primary Examiner*—Reginald L. Alexander
*Attorney, Agent, or Firm*—Stites & Harbison; Joan L. Simunic; Vance A. Smith

[57] ABSTRACT

The present invention relates to a gravity-flow displacement beverage brewing apparatus with a water flow control device. The water flow control device is attached to a rotatable lid and is opened and closed by the device user. Rotating the lid to an open position allows the user to pour cool water into a fill basin, and simultaneously closes the flow control device, so heated water cannot flow into the brewing basket. When the lid is rotated to a closed position, the user is prevented from adding more water to the fill basin, but the flow control device is opened, allowing heated water to flow into the brewing basket.

9 Claims, 5 Drawing Sheets

10
54
64
60
62
56
58
50
66
40
65
68
44
14
18
19
70
72
42
52
20
12
26

10
54
60
56
58
66
68
42
44
18
70
72
20
12
26

BREWER APPARATUS HAVING A WATER FLOW CONTROL DEVICE

This application claims the benefit of U.S. Provisional Application Ser. No. 60/116,393, filed Jan. 19, 1999.

BACKGROUND OF THE INVENTION

The present invention relates to a gravity-flow displacement beverage brewing apparatus, and more particularly, to a water flow control device within the brewing apparatus. The flow control device allows the user to control the brewing cycle initiation.

Small beverage brewers, such as residential coffee makers, produce a brewed beverage by transferring hot water from a reservoir to a brewing basket, which holds ingredients, such as coffee grinds, for brewing. The brewed beverage then flows into a carafe, and can be kept warm by a hotplate under the carafe.

One type of beverage brewer is the flash heating type of brewer apparatus. The flash heating brewer has a reservoir which is initially empty and to which the user can add cool water. The water is heated by heating coils within the reservoir, and the heated water is then transferred to the brewing basket. Because the heating process requires a finite period of time, the user has a window of time between the addition of the cool water to the apparatus and the flow of the brewed beverage into the carafe, during which the user can position a carafe beneath the brewing basket.

A second type of brewer, a gravity-flow displacement apparatus, has gained consumer popularity because this type of brewer delivers a hot beverage essentially immediately after the addition of cool water to the reservoir. In the displacement type of brewer, the reservoir holds heated water at all times. When the user adds cool water to the brewer, the cool water displaces the heated water in the reservoir forcing the heated water into the brewing basket. Because the cool water displaces preheated water, beverage brewing begins immediately upon addition of the cool water.

With the more rapid brewing of the displacement type brewer, however, there are certain attendant disadvantages. For example, the user may desire to use the same carafe to add cool water to the reservoir and to receive the brewed beverage. If the user does not replace the carafe under the brewing basket rapidly enough, the brewed beverage can spill onto the hotplate and surrounding area.

Various attempts have been made to provide the user with a window of time between the addition of the cool water and the transferring of the heated water to the brewing basket. For example, the brewer described in U.S. Pat. No. 5,251,541, assigned to Bunn-O-Matic, is a displacement-type brewer that has a stopper that can be positioned in a port between a fill basin, where the cool water initially enters the brewer, and a heated water reservoir. The stopper position is controlled by a rotatable lid that covers an opening in the top of the brewer that provides access to the fill basin. The stopper is attached to one end of a pivotally mounted lever, the motion of the lever being controlled by a fin mounted on a shaft attached to the lid. While solving the problem of prematurely initiating the brewing cycle, the structure of the lid and lever system is relatively complex, increasing the probability of malfunctions occurring with extended use.

SUMMARY OF THE INVENTION

The present invention relates to a gravity-flow displacement type beverage brewing apparatus that includes a water flow control device, attached to a rotatable lid that provides access to a fill basin. The flow control device is opened and closed by rotating the lid. When the lid is open, the flow control device is closed, so the user can pour cool water into the fill basin, but heated water cannot flow into the brewing basket. When the lid is rotated to a closed position, the flow control device is opened, and heated water is allowed to flow into the brewing basket, but the user is prevented from adding more water to the fill basin. The flow control device has a relatively simple mechanical design that is less likely to malfunction and less costly to produce than the currently available devices.

DETAILED DESCRIPTION OF THE PREFERRED EMBODIMENT

The present invention relates to a gravity-flow displacement beverage brewing apparatus, or brewer, that includes a water flow control device. The brewer depicted is selected solely for purposes of illustrating the invention. Other and different brewers may utilize the inventive features described herein as well.

Figure 1:
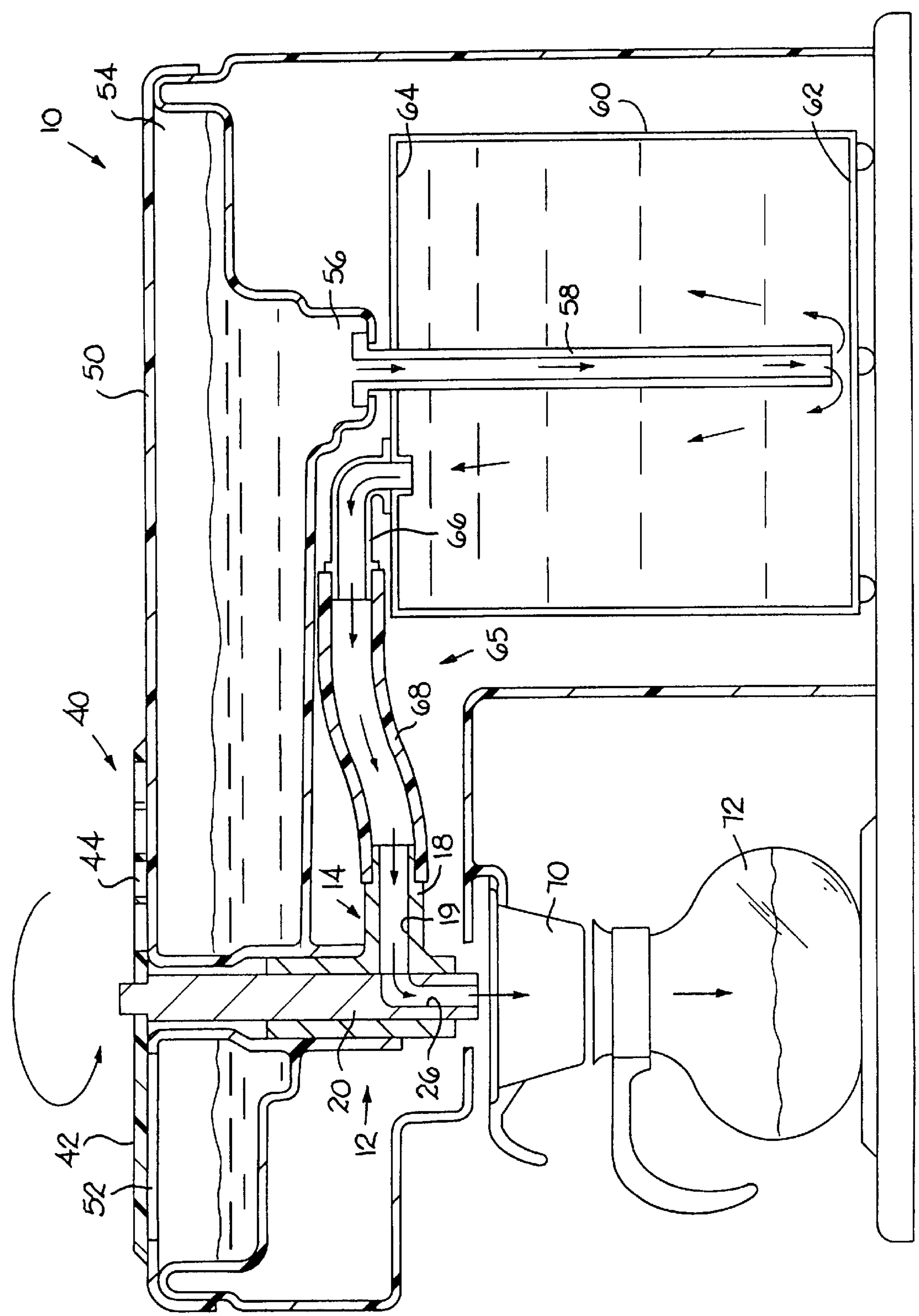
FIG. 1 is a side sectional view of a brewing apparatus made in accordance with the present invention, with the flow control device in the open position, and the lid in the closed position.
Figure 2:
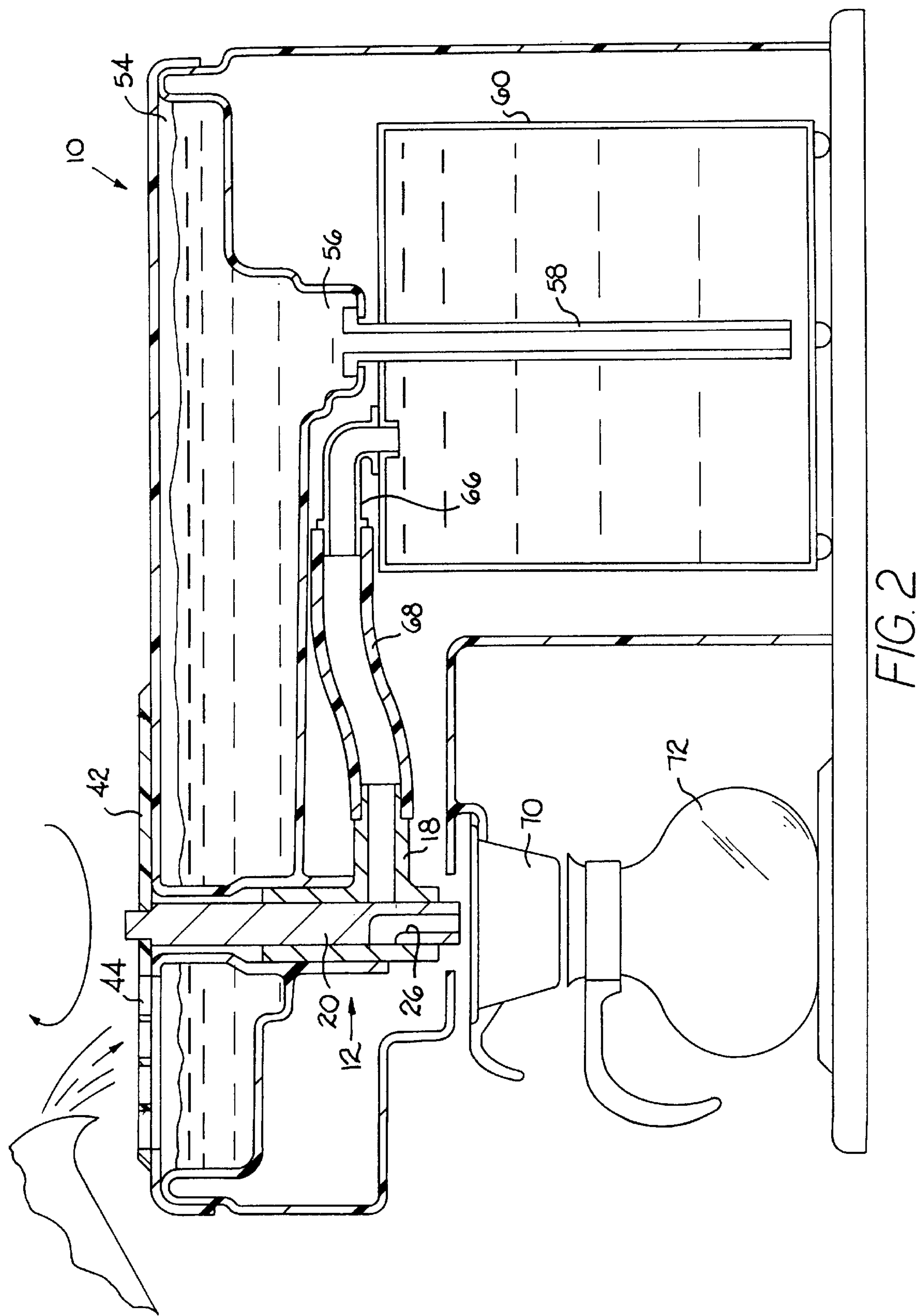
FIG. 2 is the same view as shown in FIG. 1, except that the flow control device is closed and the lid is open.

Reference is first made to FIGS. 1 and 2 in which the brewer constructed in accordance with the present invention is generally noted by the character numeral 10. The brewer of 10 has as major components a fill basin 54, to which the user can add cool water, a heated water reservoir 60, an outlet 65 leading from the reservoir 60, a flow control device 12, and a brewing basket 70 for holding ingredients, such as coffee grinds, for mixing with the heated water to make a brewed beverage. When the flow control device 12 is open, as shown in FIG. 1, cool water from the fill basin 54 can displace the heated water in the reservoir 60. The heated water is forced through the outlet 65 and through the flow control device 12, and into the brewing basket 70. The brewed beverage flows from the basket 70 into a carafe 72. When the flow control device 12 is closed, as shown in FIG. 2, cool water from the fill basin 54 cannot displace the heated water in the reservoir 60 because the heated water is prevented from moving through the flow control device 12 and into the brewing basket 70.

Figure 8:
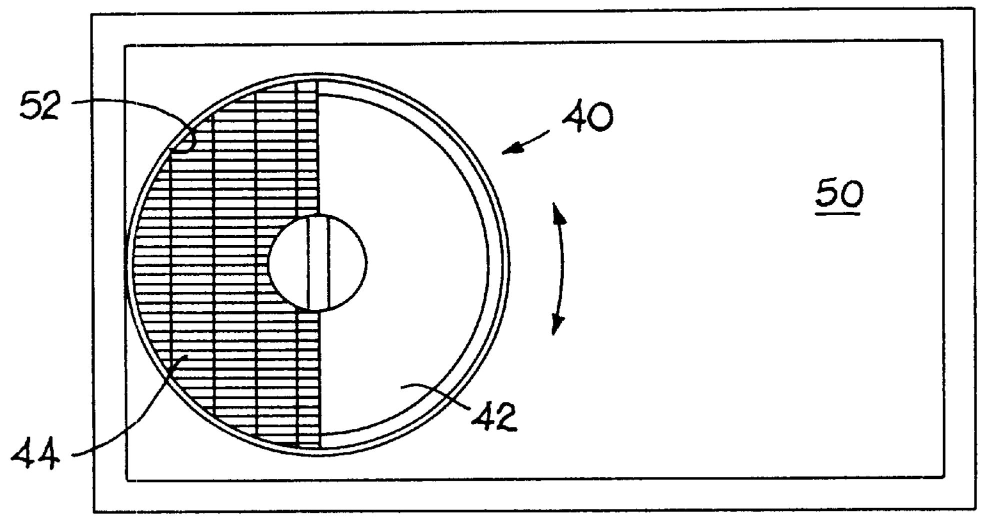
FIG. 8 is a top view of the brewing apparatus of FIG. 2.
Figure 7:
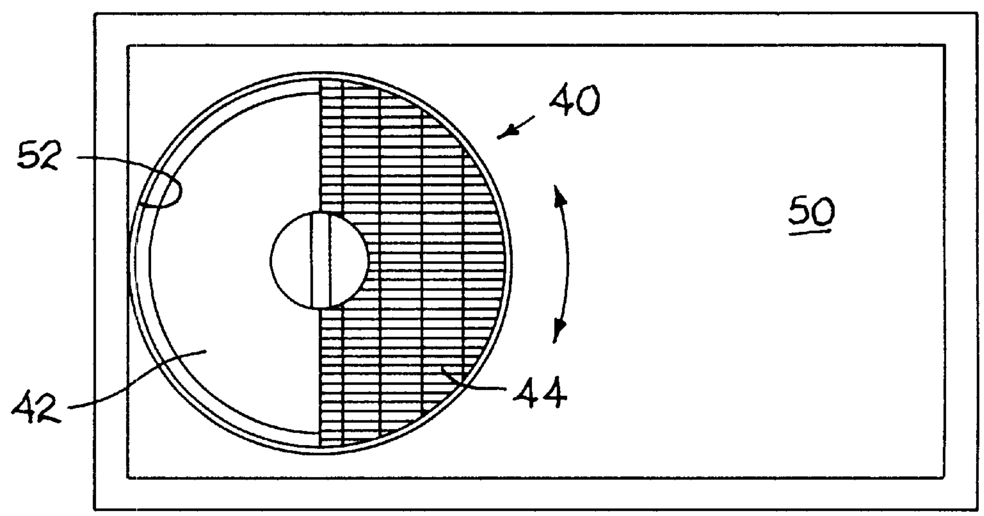
FIG. 7 is a top view of the brewing apparatus of FIG. 1.

In the preferred embodiment of the brewer 10 shown in FIGS. 1 and 2, the fill basin 54 of the brewer 10 is covered by a cover 50 having a open section 52. The open section 52 is preferably semi-circular in shape, but other shapes can be used. A rotatable lid 40, shown in FIGS. 7 and 8, having a solid portion 42 and an opened portion 44, is seated on the cover 50 and covers the entirety of the open section 52. Preferably the opened portion 44 is grated, as depicted, but any size or shaped openings can be used. In a closed position, as shown in FIG. 7, the solid portion 42 of the lid 40 is aligned with the open section 52 of the cover 50; in an open position, as shown in FIG. 8, the grated portion 44 of the lid 40 is aligned with the cover's open section 52. When the lid 40 is in the open position, liquid to be used in the brewing cycle can be added to the fill basin 54 by pouring the liquid through the grated portion 44 of the lid 40 and through the open section 52 of the cover 50. When the lid 40 is in the closed position, the fill basin 54 is not accessible to the user.

Referring again to FIG. 1, the fill basin 54 has a well 56, with a transfer tube 58 connected to the well 56. The transfer tube 58 preferably extends toward the bottom 62 of a heated water reservoir 60, which is heated by heating elements (not shown). A outlet 65 provides a means for transferring the heated water from the reservoir 60. Preferably, the outlet 65 is defined by a transfer pipe 66, attached to the top 64 of the reservoir 60, and transfer tubing 68, which connects the transfer pipe 66 to the flow control device 12.

Figure 5:
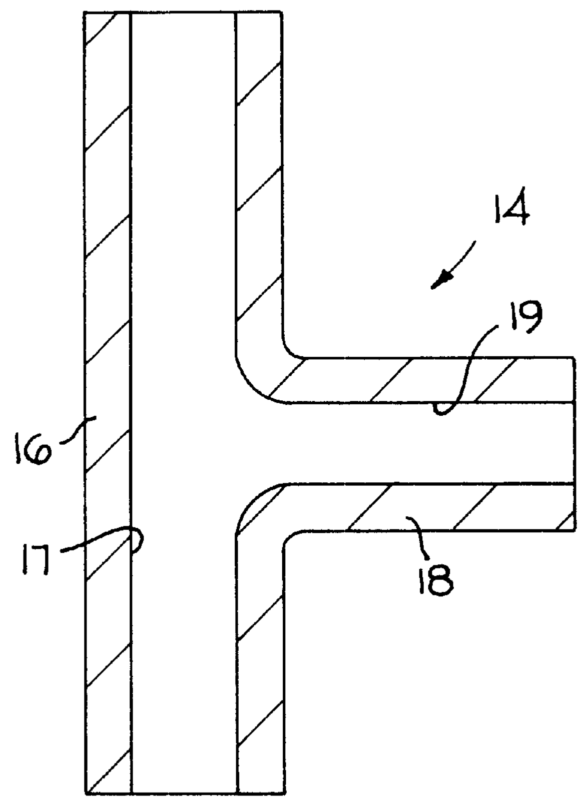
FIG. 5 is a sectional view of the valve body of the flow control device of the brewing apparatus of FIG. 1, with the valve stem removed.

The flow control device 12 is defined by a T-shaped pipe 14, a valve stem 20, the rotatable lid 40, and the cover 50. The T-shaped pipe 14, as best shown in FIG. 5, has a body 16 and an essentially perpendicular arm 18. A first bore 17 extends longitudinally through the body 16; a second bore 19 extends through the arm 18, and intersects the first bore 17. Preferably, the transfer pipe 66 is attached to the arm 18 to allow for fluid communication between the reservoir 60 and the flow control device 12.

Figure 6:
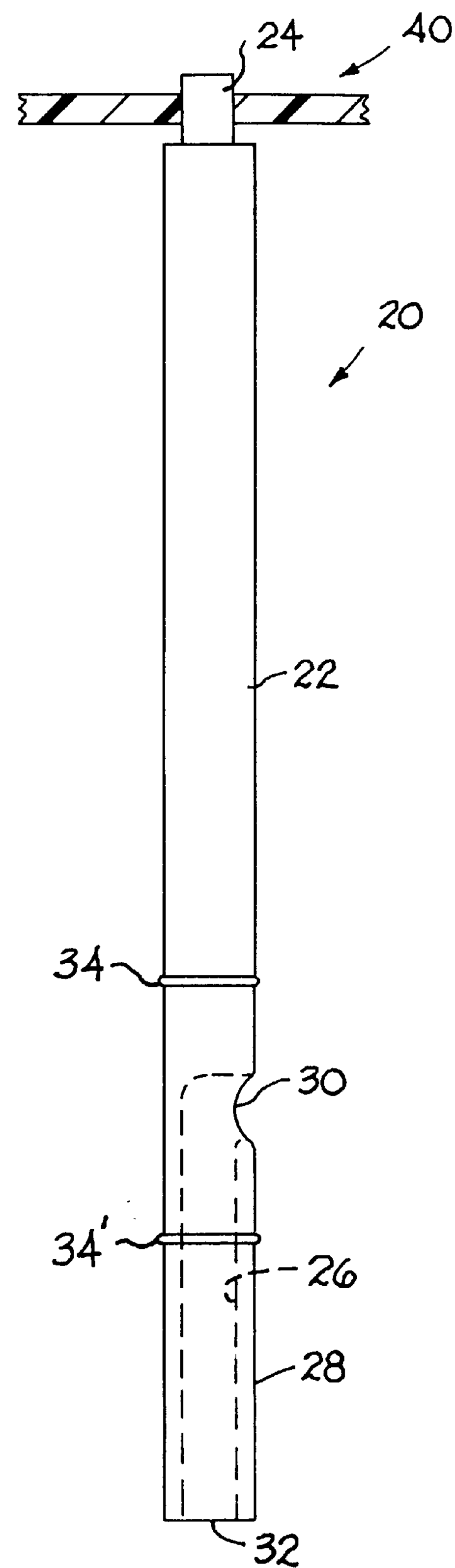
FIG. 6 is the valve stem of the flow control device of the brewing apparatus of FIG. 1, with the channel shown in phantom.

The valve stem 20, as best shown in FIGS. 1 and 6, having a first end 24 attached to the lid 40, preferably protrudes through the first bore 17 of the T-shaped pipe 14. The valve stem 20 defines a passageway 26, which is substantially parallel to the axis of rotation of the valve stem 20. The passageway 26 has an entry orifice 30, which extends through a sidewall 22 of the valve stem 20, and which is aligned with the second bore 19 when the lid 40 is seated on the cover 50. The passageway 26 also has a terminal orifice 32 at a second end 28 of the valve stem 20, which allows water to flow into the brewing basket 70 when the flow control device 12 is open, as shown in FIG. 1. Two O-rings 34, 34', mounted on the exterior of the valve stem 20 above and below the entry orifice 30, form a seal between the valve stem 20 and the interior walls of the T-shaped pipe 14 to prevent liquid from leaking from the second bore 19 into the first bore 17 along the exterior of the valve stem 20. Preferably, the lid 40 is attached to the valve stem 20 with snap fittings, but any appropriate means, such as glue or adhesive, can be used. Alternatively, the lid 40 and valve stem 20 can be formed as a one-piece molded unit.

Figure 3:
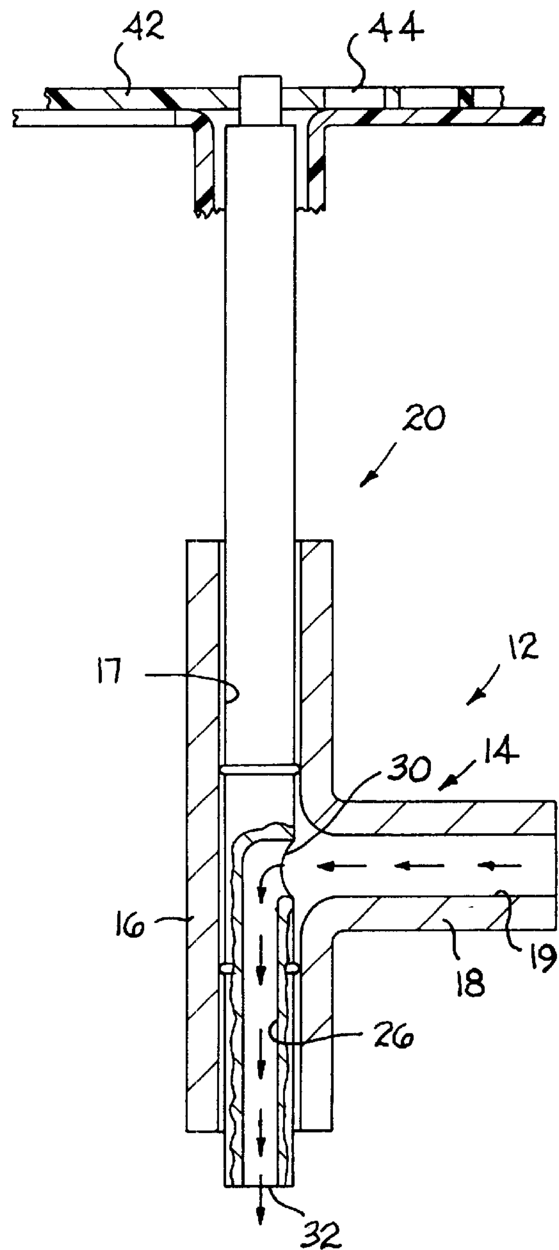
FIG. 3 is an enlarged sectional view of the flow control device of the brewing apparatus of FIG. 1.
Figure 4:
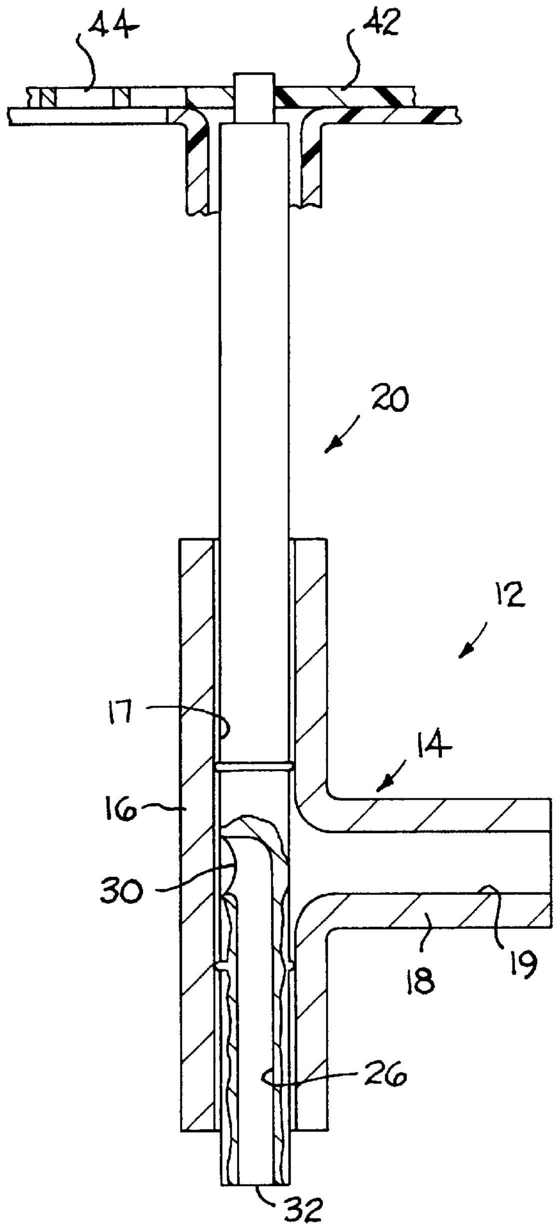
FIG. 4 is an enlarged sectional view of the flow control device of the brewing apparatus of FIG. 2.

The lid 40 is keyed to the valve stem 20, the cover 50, and the T-shaped pipe 14 such that when the solid portion 42 of the lid 40 is aligned with the open section 52 of the cover 50, the entry orifice 30 of the valve stem 20 is aligned with the arm 18 of the T-shaped pipe 14. Thus, as shown in FIGS. 1 and 3, when the rotatable lid 40 is in the closed position, the entry orifice 30 of the valve stem 20 is aligned with the second bore 19 of the T-shaped pipe 14, so the flow control device 12 is open. As indicated by the arrows F in FIG. 1, when the lid 40 is closed and the flow control device 12 is open, cool water from the fill basin 54 is gravity fed into the transfer tube 58, and then into the reservoir 60. As the cool water flows into the reservoir 60, heated water in the reservoir 60 is forced into the transfer pipe 66 and tubing 68, then through the second bore 19 of the pipe arm 18, and then through the passageway 26, exiting into the brewing basket 70. By rotating the lid 40 to the open position, as shown in FIGS. 2 and 4, the entry orifice 30 of the valve stem 20 is moved out of alignment with the second bore 19 of the T-shaped pipe 14, thereby closing the flow control device 12. When the flow control device 12 is closed, cool water can be added to the fill basin 54, but water cannot flow from the heated water reservoir 60 into the brewing basket 70 because the pathway to the basket 70 is blocked by the valve stem 20.

Thus, the user initiates the brewing cycle by rotating the lid 40 from the open to the closed position, thereby indirectly rotating the flow control device 12 from the closed to the open position.

It will be obvious to those skilled in the art that modifications may be made to the embodiments described above without departing from the scope of the present invention.

What is claimed is:

1. A beverage brewing apparatus comprising:

a fill basin for receiving liquid to be used in a beverage brewing cycle;

a reservoir in liquid communication with said fill basin for holding the liquid to be used in the brewing cycle;

an outlet in fluid communication with said reservoir; and a flow control device comprising:

a cover, having at least one inlet opening, for covering said fill basin;

a lid, having at least one fill opening therein and mounted on said cover, said lid having a first position relative to said cover in which the fill opening of said cover and the inlet opening of said lid are aligned, thereby permitting liquid to pass into said fill basin, and said lid having a second position relative to said cover in which the inlet opening of said cover and the fill opening of said lid are out of alignment, preventing liquid from being introduced into said fill basin; and a movable valve member, operatively connected to said lid, said valve member placing said reservoir out of liquid communication with said outlet when said lid is in the first position, and placing said reservoir and said outlet in liquid communication when said lid is in the second position.

2. The brewing apparatus as recited in claim 1, wherein said valve member is an elongated stem including a passageway, having a first orifice in selective liquid communication with said reservoir and a second orifice in liquid communication with a basket for holding a brewing material, the first orifice being in liquid communication with said reservoir when said lid is in the first position, and the first orifice being out of liquid communication when said lid is in the second position.

3. The valve member as recited in claim 2, further including a T-shaped member, having intersecting first and second bores, wherein the elongated stem protrudes through the first bore, and the first orifice is aligned with the second bore.

4. The brewing apparatus as recited in claim 1, wherein said inlet opening of said cover has a semi-circular configuration.

5. The brewing apparatus as recited in claim 1, wherein said fill opening of said lid further includes grating.

6. The brewing apparatus as recited in claim 1, wherein said outlet comprises a transfer pipe.

7. The brewing apparatus as recited in claim 1, further including a transfer tube for placing said fill basin in liquid communication with said reservoir.

8. The brewing apparatus as recited in claim 1, wherein said fill basin further includes a well.

9. The brewing apparatus as recited in claim 1, wherein said reservoir further including heating elements.

* * * * *

UNITED STATES PATENT AND TRADEMARK OFFICE

CERTIFICATE OF CORRECTION

PATENT NO. : 6,067,895
DATED : May 30, 2000
INVENTOR(S) : Ronald William Buist; William A. Dahmen It is certified that error appears in the above-identified patent and that said Letters Patent is hereby corrected as shown below:

Title page,
In Inventor section [76] the following inventor was omitted and should be added -- Joseph James Hennessey, 607 South Wisconsin Drive, Howards Grove, WI 53083 --

Signed and Sealed this

Thirty-first Day of July, 2001

Attest:

*Nicholas P. Godici*

NICHOLAS P. GODICI
*Acting Director of the United States Patent and Trademark Office*

*Attesting Officer*